(12) United States Patent
Awasa

(10) Patent No.: US 12,241,521 B2
(45) Date of Patent: Mar. 4, 2025

(54) HYDRAULIC SHOCK ABSORBER AND METHOD FOR MANUFACTURING SAME

(71) Applicant: Hitachi Astemo, Ltd., Hitachinaka (JP)

(72) Inventor: Shigeki Awasa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 903 days.

(21) Appl. No.: 17/333,679

(22) Filed: May 28, 2021

(65) Prior Publication Data

US 2021/0293298 A1 Sep. 23, 2021

Related U.S. Application Data

(63) Continuation of application No. PCT/JP2019/002859, filed on Jan. 29, 2019.

(51) Int. Cl.
*B62K 25/08* (2006.01)
*F16F 9/18* (2006.01)
*F16F 9/32* (2006.01)

(52) U.S. Cl.
CPC ............ *F16F 9/3221* (2013.01); *F16F 9/187* (2013.01); *F16F 9/3257* (2013.01); *B62K 25/08* (2013.01)

(58) Field of Classification Search
CPC .......... F16F 9/363; F16F 9/366; F16F 9/3221; F16F 9/3257; B62K 25/08
See application file for complete search history.

(56) References Cited

U.S. PATENT DOCUMENTS

| 8,474,850 B2 * | 7/2013 | Pasino | F16J 15/3252 |
| | | | 188/282.1 |
| 10,072,723 B2 * | 9/2018 | Hart | F16F 9/363 |
| 10,487,901 B2 * | 11/2019 | Szostek | F16F 9/3278 |
| 2010/0166343 A1 * | 7/2010 | Hibi | F16C 33/14 |
| | | | 384/107 |

(Continued)

FOREIGN PATENT DOCUMENTS

| JP | 59-203852 A | 11/1984 |
| JP | 61-278637 A | 12/1986 |

(Continued)

OTHER PUBLICATIONS

Machine translation of JP2015-080818 (Year: 2024).*

(Continued)

*Primary Examiner* — Bradley T King
(74) *Attorney, Agent, or Firm* — Leason Ellis LLP; Edward J. Ellis; Melvin C. Garner

(57) ABSTRACT

A front fork includes a first tube body having an oil flowing therein, a second tube body provided inside the first tube body, the second tube body having the oil flowing therein, and having the oil flowing in an oil passage formed between the first tube body and the second tube body, a partition member provided in the second tube body and partitioning one end of an oil chamber, a rod extending along an axis of the second tube body through the partition member and being configured to move relative to the partition member, an outer periphery of the rod having a dimple portion recessed toward a center of the rod, and a piston provided at a distal end of the rod and allowing the oil to pass, wherein a boundary between an outer peripheral surface of the rod and the dimple portion is formed by a curved surface.

9 Claims, 7 Drawing Sheets

(56) References Cited

U.S. PATENT DOCUMENTS

| | | | | |
|---|---|---|---|---|
| 2011/0042915 A1* | 2/2011 | Felsl | ..................... | F16F 9/3278 |
| | | | | 280/283 |
| 2011/0235955 A1* | 9/2011 | Lee | ........................ | F16C 17/02 |
| | | | | 384/397 |
| 2012/0187651 A1* | 7/2012 | Wimmer | ................ | B62K 25/08 |
| | | | | 280/276 |
| 2013/0207326 A1* | 8/2013 | Cotter | ................... | F16F 9/0218 |
| | | | | 267/141 |
| 2021/0062564 A1* | 3/2021 | Kato | ....................... | F16F 9/516 |
| 2023/0341023 A1* | 10/2023 | Kotani | .................... | F16F 9/348 |

FOREIGN PATENT DOCUMENTS

| | | |
|---|---|---|
| JP | 11-270677 A | 10/1999 |
| JP | 11-270678 A | 10/1999 |
| JP | 2003-148546 A | 5/2003 |
| JP | 2005-308169 A | 11/2005 |
| JP | 2009-156348 A | 7/2009 |
| JP | 2010-261486 A | 11/2010 |
| JP | 2015-080818 A | 4/2015 |

OTHER PUBLICATIONS

Machine translation of JP 2003-148546 (Year: 2024).*
Machine translation of 61-278637 (Year: 2024).*
International Search Report mailed Apr. 23, 2019 for the corresponding PCT International Patent Application No. PCT/JP2019/002859.
Written Opinion mailed Apr. 23, 2019 for the corresponding PCT International Patent Application No. PCT/JP2019/002859.

* cited by examiner

HYDRAULIC SHOCK ABSORBER AND METHOD FOR MANUFACTURING SAME

CROSS-REFERENCE TO RELATED APPLICATION

This application is a continuation of PCT application No. PCT/JP2019/002859, which was filed on Jan. 29, 2019, the content of which is incorporated herein by reference in its entirety.

FIELD OF THE INVENTION

The present invention relates to a hydraulic shock absorber for damping energy, such as vibration, using oil.

BACKGROUND OF THE INVENTION

In many two-wheeled vehicles, a shock absorber is provided in order to damp vibration and the like transmitted from unevenness of a road surface to a driver during traveling. As the shock absorber, a hydraulic shock absorber for damping energy such as vibration using oil filled inside is known. As the hydraulic shock absorber, there is a technique disclosed in Patent Literature 1.

A hydraulic shock absorber as disclosed in Patent Literature 1 includes: an inner tube formed in a tubular shape and having an oil flowing therein; a damper cylinder provided inside the inner tube in a manner relatively movable along an axis of the inner tube; a fixed partition member fix to an inner periphery of the damper cylinder and partitioning one end of an oil chamber; a rod extending along an axis of the damper cylinder through the fixed partition member in a manner movable relative to the damper cylinder; and a piston provided at a distal end of the rod and allowing the oil to pass.

During compression and extension, the oil passing through the piston becomes a resistance, so as to damp an energy of vibration or the like. At this time, oil adhering to the rod moves together with the rod when the rod advances or retracts, and circulates in the hydraulic shock absorber.

Patent Literature 1: JP-A-2003-148546

Incidentally, the hydraulic shock absorber may be mounted on a two-wheeled vehicle of an off-road type that travels on an unpaved road surface. Since an unpaved road surface has a large unevenness, a hydraulic pressure of the hydraulic shock absorber is set higher than that of a general two-wheeled vehicle.

With respect to such an off-road type two-wheeled vehicle, there is a demand for traveling on a paved road as well.

In a case where a two-wheeled vehicle mounted with a hydraulic shock absorber of the related art is traveling on a paved road, an operation amount of the hydraulic shock absorber is smaller than that in a case of traveling on an unpaved road surface. That is, an advancing/retracting amount of the rod is small. Therefore, a sufficient amount of oil cannot be circulated.

On the other hand, in a case where the hydraulic pressure of the hydraulic shock absorber is set low, a sufficient damping force cannot be generated when traveling on an unpaved road surface.

SUMMARY OF THE INVENTION

An object of the present invention is to provide a hydraulic shock absorber capable of sufficiently circulating oil under various conditions of use.

The present invention provides a hydraulic shock absorber including: a first tube body formed in a tubular shape and having an oil flowing therein; a second tube body that is a tube body provided inside the first tube body, the second tube body having the oil flowing therein, and having the oil flowing in an oil passage formed between the first tube body and the second tube body; a partition member provided in the second tube body and partitioning one end of an oil chamber; a rod extending along an axis of the second tube body through the partition member and being configured to move relative to the partition member, an outer periphery of the rod having dimple portions recessed toward a center of the rod; and a piston provided at a distal end of the rod and allowing the oil to pass.

Advantageous Effects of Invention

In the present invention, the rod has a dimple portion recessed from the outer periphery toward the center. A part of the oil in the oil chamber enters the dimple portion. When the rod passes through the partition member in a state where the oil is accumulated in the dimple portion, the oil is carried to an adjacent oil chamber or gas chamber. By increasing an amount of the oil carried to the adjacent oil chamber or gas chamber, a circulation amount of oil can be increased. A hydraulic shock absorber capable of circulating oil sufficiently under various conditions of use can be provided.

DETAILED DESCRIPTION OF THE INVENTION

Figure 1:
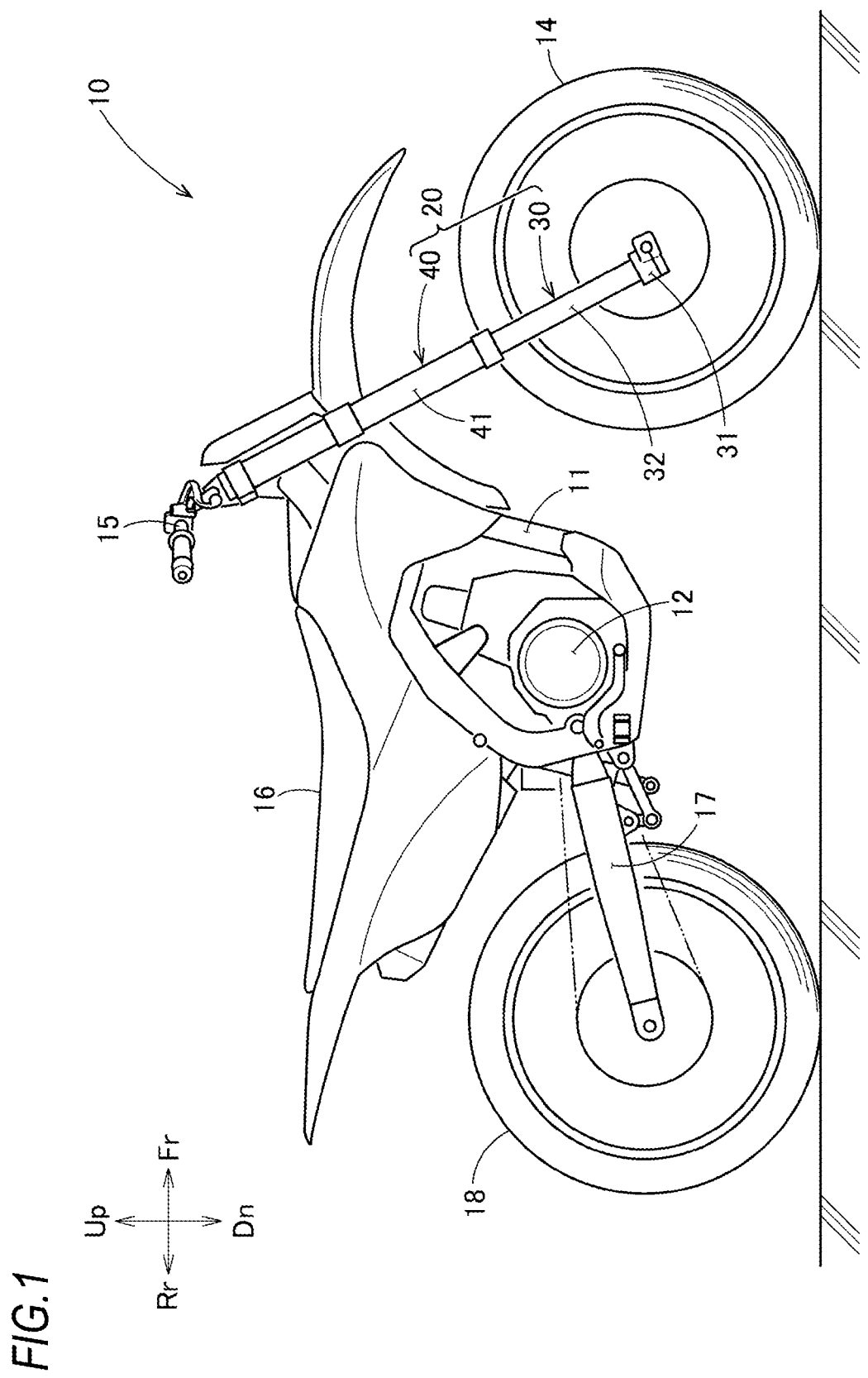
FIG. 1 is a side view of a two-wheeled vehicle mounted with a hydraulic shock absorber according to Embodiment 1.

Embodiments of the present invention will be described below with reference to the accompanying drawings. In the description, left and right refer to left and right with respect to a rider of a two-wheeled vehicle, and front and rear refer to front and rear with respect to a traveling direction of the vehicle. In the drawings, "Up" indicates an upper direction, and "Dn" indicates a lower direction.

Embodiment 1

Refer to FIG. 1. A hydraulic shock absorber 20 according to Embodiment 1 is applied to, for example, a front fork 20 mounted on a two-wheeled vehicle 10 of an off-road type. Hereinafter, the hydraulic shock absorber 20 is appropriately referred to as the front fork 20.

The two-wheeled vehicle 10 includes: a vehicle body 11; an engine 12 supported at a lower portion of the vehicle body 11; left and right front forks 20 (only the right front fork 20 is shown in the drawings) that are provided on the left and right of a front portion of the vehicle body 11 and absorb impact received from unevenness of a road surface; a front wheel 14 sandwiched between and rotatably supported by the front forks 20; a handle pipe 15 disposed above the front forks 20 for steering the front wheel 14; a seat 16 provided above the engine 12, on which a rider is to sit; a swing arm 17 extending rearward from a rear portion of the vehicle body 11 and swingable in an upper-lower direction; and a rear wheel 18 rotatably supported by the swing arm 17.

The left and right front forks 20 have the same configuration. Hereinafter, the right front fork 20 will be described, and the description of the left front fork will be omitted.

The left and right front forks 20 may also have different configurations depending on the purpose.

Figure 2:
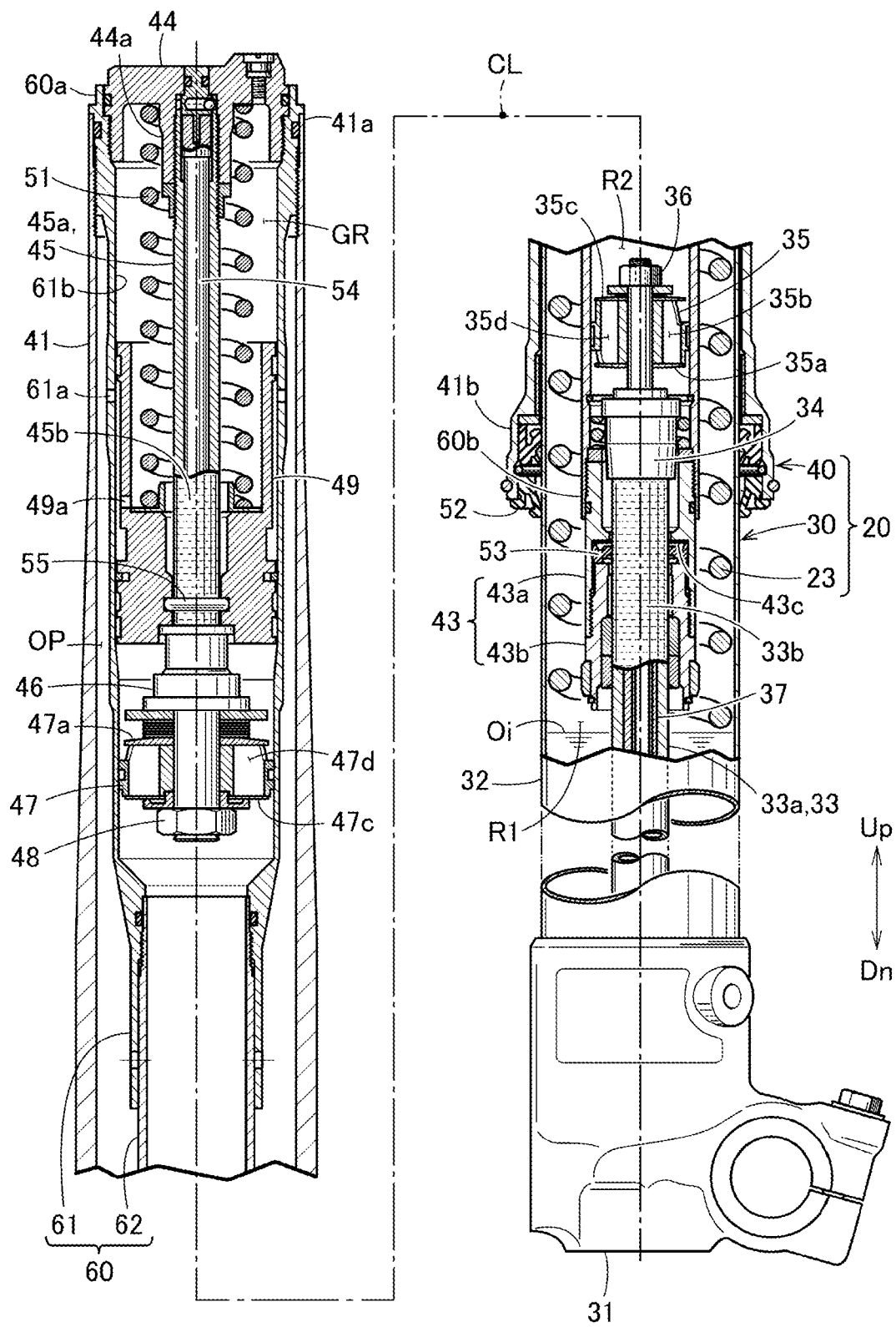
FIG. 2 is a cross-sectional view of the hydraulic shock absorber shown in FIG. 1.

Refer to FIG. 2. The front fork 20 mainly includes: an axle-side unit 30 fixed to the front wheel 14 (see FIG. 1); a vehicle-body-side unit 40 overlapped with an outer periphery of the axle-side unit 30 and having an upper end fixed to the vehicle body 11 (see FIG. 1); and a shock absorbing spring 23 that biases the axle-side unit 30 and the vehicle-body-side unit 40 in directions away from each other so as to absorb the impact received from the unevenness of the road surface (see FIG. 1).

The front fork 20 may have a configuration in which a lower portion of the vehicle-body-side unit 40 is covered by an upper portion of the axle-side unit 30.

The axle-side unit 30 includes: an axle bracket 31 (support member 31) to which an axle of the front wheel 14 (see FIG. 1) is fixed; an inner tube 32 (first tube body 32) having a lower end fixed to the axle bracket 31 and an upper portion provided along an inner periphery of the vehicle-body-side unit 40; a main rod 33 (rod 33) provided inside the inner tube 32 and having a lower end supported by the axle bracket 31 together with the inner tube 32; a piston holder 34 fixed to a distal end of the main rod 33; a main piston 35 (piston 35) held by the piston holder 34; and a nut 36 fixed to a distal end of the piston holder 34 and preventing the main piston 35 from coming off the main rod 33.

The inner tube 32 is filled with an oil Oi. A lower portion of the inner tube 32 is a first oil chamber R1 in which the oil Oi is stored.

Figure 3:
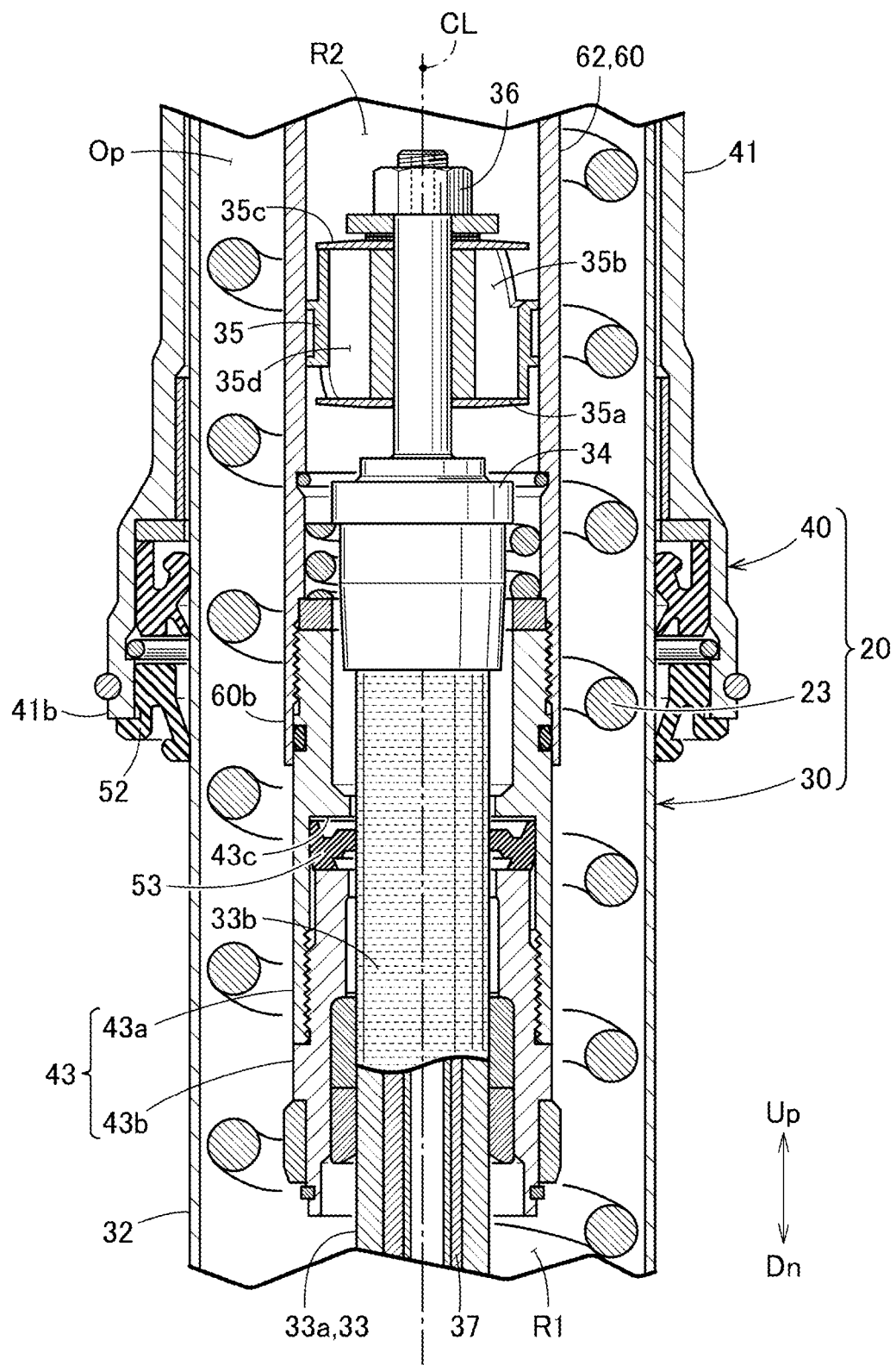
FIG. 3 is an enlarged view of a main part of FIG. 2.

Refer to FIG. 3. The main rod 33 is formed in a tubular shape and is provided on an inner periphery of the inner tube 32. The main rod 33 is provided coaxially with an axis CL of the inner tube 32. A damping force adjusting rod 37 that advances and retracts along the axis CL and thereby adjusts a damping force is provided inside the main rod 33.

Figure 4:
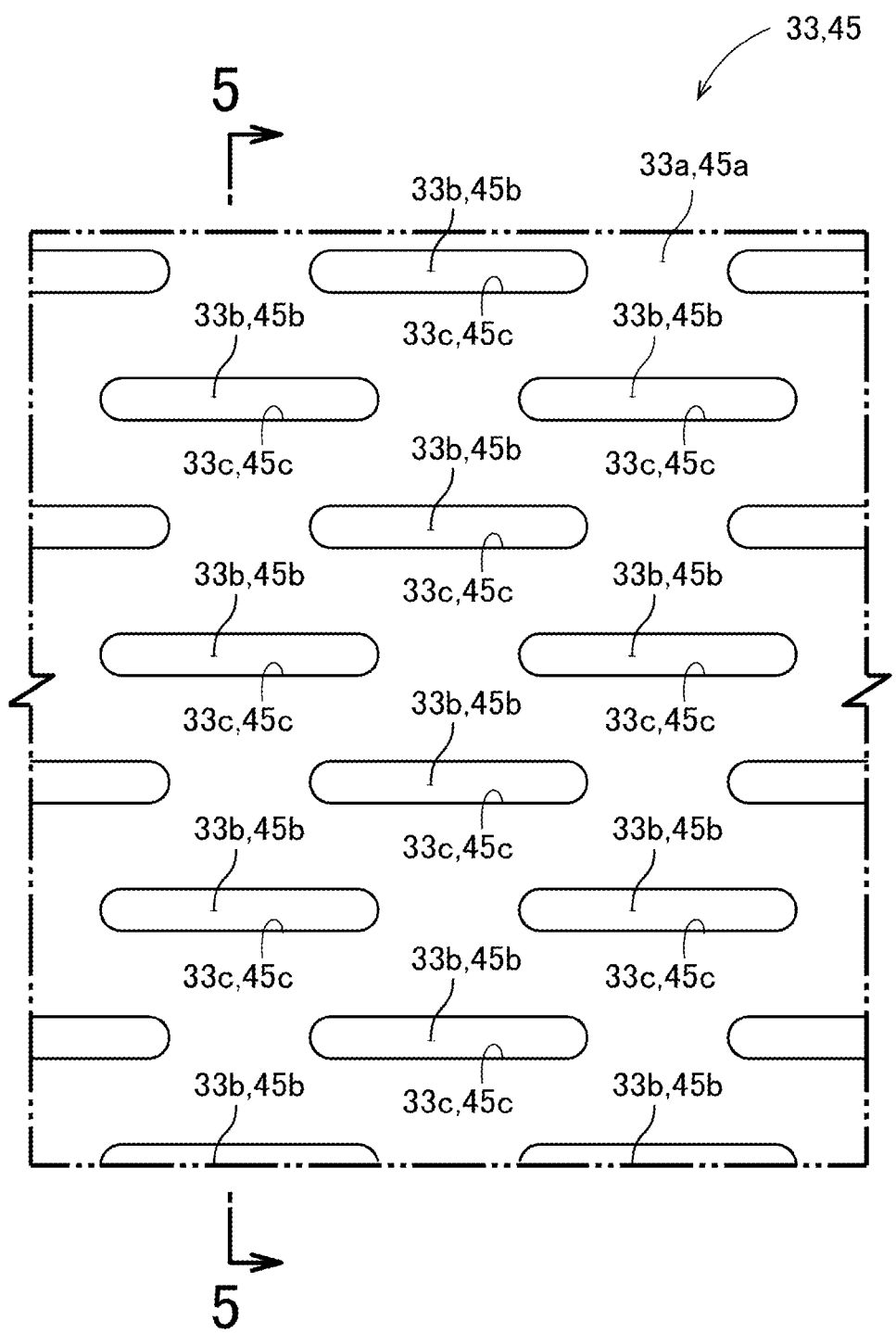
FIG. 4 is an enlarged view of dimple portions shown in FIG. 2.

Refer to FIG. 4. An outer peripheral surface 33a of the main rod 33 is formed with dimple portions 33b recessed toward a center (axis CL). The dimple portions 33b are formed in a staggered pattern on the entire outer peripheral surface 33a of the main rod 33. In other words, the plurality of dimple portions 33b are formed in a manner offset from each other with respect to a direction along the axis CL, and ones of the dimple portions 33b adjacent to each other in the direction along the axis CL are offset formed in a manner offset from each other with respect to a circumferential direction.

A range in which the dimple portions 33b are formed may not be the entire outer peripheral surface 33a. The range in which the dimple portions 33b are formed can be appropriately set according to a necessary lubrication amount of the oil Oi (see FIG. 2) and the like.

Figure 5:
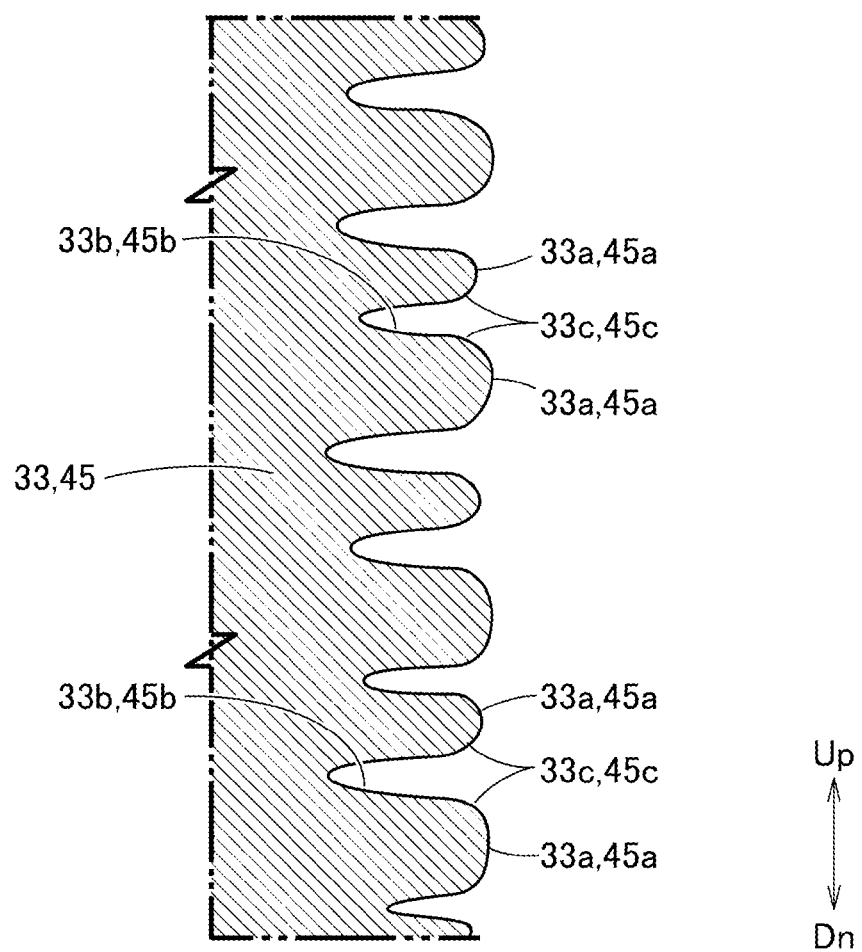
FIG. 5 is a cross-sectional view taken along line 5-5 of FIG. 4.

Refer to FIG. 5. A boundary portion 33c that is a boundary between the outer peripheral surface 33a of the main rod 33 (see FIG. 2) and each dimple portion 33b is formed by a curved surface.

Refer to FIG. 3. The main piston 35 includes: a compression-side valve 35a that is opened by a pressure of the oil Oi (see FIG. 2) when the front fork 20 is compressed; a compression-side port 35b through which the oil Oi passes when the compression-side valve 35a is opened; an extension-side valve 35c that is opened by the pressure of the oil Oi when lowered with respect to the vehicle-body-side unit 40 (when the front fork 20 is extended); and an extension-side port 35d through which the oil Oi passes when the extension-side valve 35c is opened.

Refer to FIG. 2. The vehicle-body-side unit 40 includes: an outer tube 41 (first tube body 41) that covers an outer periphery of the inner tube 32; a damper cylinder 60 (second tube body 60) provided inside the outer tube 41 and having one end 60a (see FIG. 2) fixed to one end 41a of the outer tube 41; a fixed partition member 43 (partition member 43) fixed to the other end 60b of the damper cylinder 60 and closing the other end 60b of the damper cylinder 60; a fork bolt 44 that closes the one end 60a of the damper cylinder 60; a sub rod 45 (rod 45) fixed to the fork bolt 44 and extending along the axis CL of the damper cylinder 60; a piston holder 46 fixed to a distal end of the sub rod 45; a sub piston 47 (piston 47) held by the piston holder 46; a nut 48 fixed to a distal end of the piston holder 46 and prevents the sub piston 47 from coming off the sub rod 45; a movable partition member 49 (partition member 49) provided on an outer periphery of the sub rod 45 and movable along the axis CL of the sub rod 45; and a return spring 51 that biases the movable partition member 49 toward the sub piston 47.

The one end 41a of the outer tube 41 is formed in a female screw shape, and is fastened to the one end 60a of the damper cylinder 60. The other end 41b of the outer tube 41 bulges in a radial direction thereof. The bulged portion is provided with a dust seal 52 for preventing dust from entering between the outer tube 41 and the inner tube 32.

The damper cylinder 60 includes an upper cylinder 61 disposed at an upper portion thereof and having an upper end fixed to the fork bolt 44, and a lower cylinder 62 fastened to a lower end of the upper cylinder 61. An oil passage OP through which the oil Oi can pass is provided between an outer periphery of the damper cylinder 60 and an inner periphery of the outer tube 41.

An inner periphery of the upper end of the upper cylinder 61 is formed in a female screw shape, and is closed by the fork bolt 44 fastened to this portion. An outer periphery of this portion formed in a female screw shape is formed in a male screw shape. The outer tube 41 is fastened to this portion formed in a male screw shape. The lower portion of the upper cylinder 61 is formed in a female screw shape so as to be able to fasten the upper end of the lower cylinder 62. An oil hole 61a through which the oil Oi passes is opened in the upper cylinder 61.

An upper end of the lower cylinder 62 is formed in a male screw shape and is fastened to the upper cylinder 61. A lower end of the lower cylinder 62 is formed in a female screw shape, and the fixed partition member 43 is fastened thereto.

The fixed partition member 43 is fastened to the lower end of the lower cylinder 62 and closes the lower end of the lower cylinder 62. A center of the fixed partition member 43 is penetrated by the main rod 33 along the axis CL. A part of an inner periphery of the damper cylinder 60 above the fixed partition member 43 is defined as a second oil chamber R2 through which the oil Oi passes. That is, the fixed partition member 43 partitions the first oil chamber R1 and the second oil chamber R2.

The fixed partition member 43 includes: an upper partition member 43a whose lower end is formed in a female screw shape; and a lower partition member 43b whose upper end formed in a male screw shape. A seal member 53 in contact with the main rod 33 is interposed between the upper partition member 43a and the lower partition member 43b.

The upper partition member 43a has a substantially cylindrical shape as a whole, and has a projection 43c projecting from a part of an inner peripheral surface of the upper partition member 43a toward the axis CL and receiving the seal member 53. An upper end of the upper partition member 43a is formed in a male screw shape.

The lower partition member 43b has a substantially central portion whose outer periphery is formed in a male screw shape. The upper end of the lower partition member 43b is in contact with the seal member 53.

The seal member 53 is sandwiched between the projection 43c of the upper partition member 43a and the upper end of the lower partition member 43b. The seal member 53 is in contact with the main rod 33 and prevents downward outflow of the oil Oi.

The fork bolt 44 has an outer periphery formed in a male screw shape and fastened to an inner periphery of the upper cylinder 61. The fork bolt 44 has a female screw portion 44a projecting downward along the axis CL and formed in a female screw shape, and the sub rod 45 is fastened to the female screw portion 44a. An outer periphery of the female screw portion 44a extends along an inner periphery of the return spring 51 and serves as a guide for the return spring 51.

The sub rod 45 is formed in a tubular shape and is provided on an inner periphery of the upper cylinder 61. The sub rod 45 is provided coaxially with the axis CL of the upper cylinder 61. A damping force adjusting rod 54 that advances and retracts along the axis CL and thereby adjusts a damping force is provided inside the sub rod 45.

Refer to FIG. 4. A surface of the sub rod 45 is substantially the same as the surface of the main rod 33. Therefore, the outer peripheral surface of the sub rod 45 will be described with reference to FIG. 4. An outer peripheral surface 45a of the sub rod 45 is formed with dimple portions 45b recessed toward the center (axis CL). The dimple portions 45b are formed in a staggered pattern on the entire outer peripheral surface 45a of the sub rod 45. In other words, the plurality of dimple portions 45b are formed in a manner offset from each other with respect to the direction along the axis CL, and ones of the dimple portions 45b adjacent to each other in the direction along the axis CL are formed in a manner offset from each other with respect to the circumferential direction.

A range in which the dimple portions 45b are formed may not be the entire outer peripheral surface 45a. The range in which the dimple portions 45b are formed can be appropriately set according to a necessary lubrication amount of the oil Oi and the like.

Refer to FIG. 5. A boundary portion 45c that is a boundary between the outer peripheral surface 45a of the sub rod 45 and each dimple portion 45b is formed by a curved surface.

Refer to FIG. 2. The sub piston 47 includes: a compression-side valve 47a that is opened by the pressure of the oil Oi when the front fork 20 is compressed; a compression-side port through which the oil Oi passes when the compression-side valve 47a is opened; an extension-side valve 47c that is opened by the pressure of the oil Oi when the front fork 20 is extended; and an extension-side port 47d through which the oil Oi passes when the extension-side valve 47c is opened.

A center of the movable partition member 49 is penetrated by the sub rod 45 along the axis CL. The movable partition member 49 has an inner periphery in contact with the outer peripheral surface 45a of the sub rod 45, and has an outer periphery in contact with the inner peripheral surface 61b of the upper cylinder 61. The movable partition member 49 is provided with a seal member 55.

The seal member 55 is in contact with the sub rod 45 and prevents downward outflow of the oil Oi. An oil hole 49a through which the oil Oi passes is opened in the movable partition member 49. [0046] A region inside the upper cylinder 61 that is partitioned by the movable partition member 49 and the fork bolt 44 is a gas chamber GR filled with air.

The movable partition member 49 partitions the second oil chamber R2 and the gas chamber GR.

Next, an operation of the front fork 20 according to the present invention will be described.

The front fork 20 is compressed and expanded when the two-wheeled vehicle 10 (see FIG. 1) travels beyond the unevenness of the road surface. During compression, the axle-side unit 30 and the vehicle-body-side unit 40 approach each other against the biasing force of the shock absorbing spring 23. After compression, the axle-side unit 30 and the vehicle-body-side unit 40 are separated from each other by the biasing force of the shock absorbing spring 23 and return to their original positions. During traveling, expansion and contraction are repeated in a short period of time.

Figure 6:
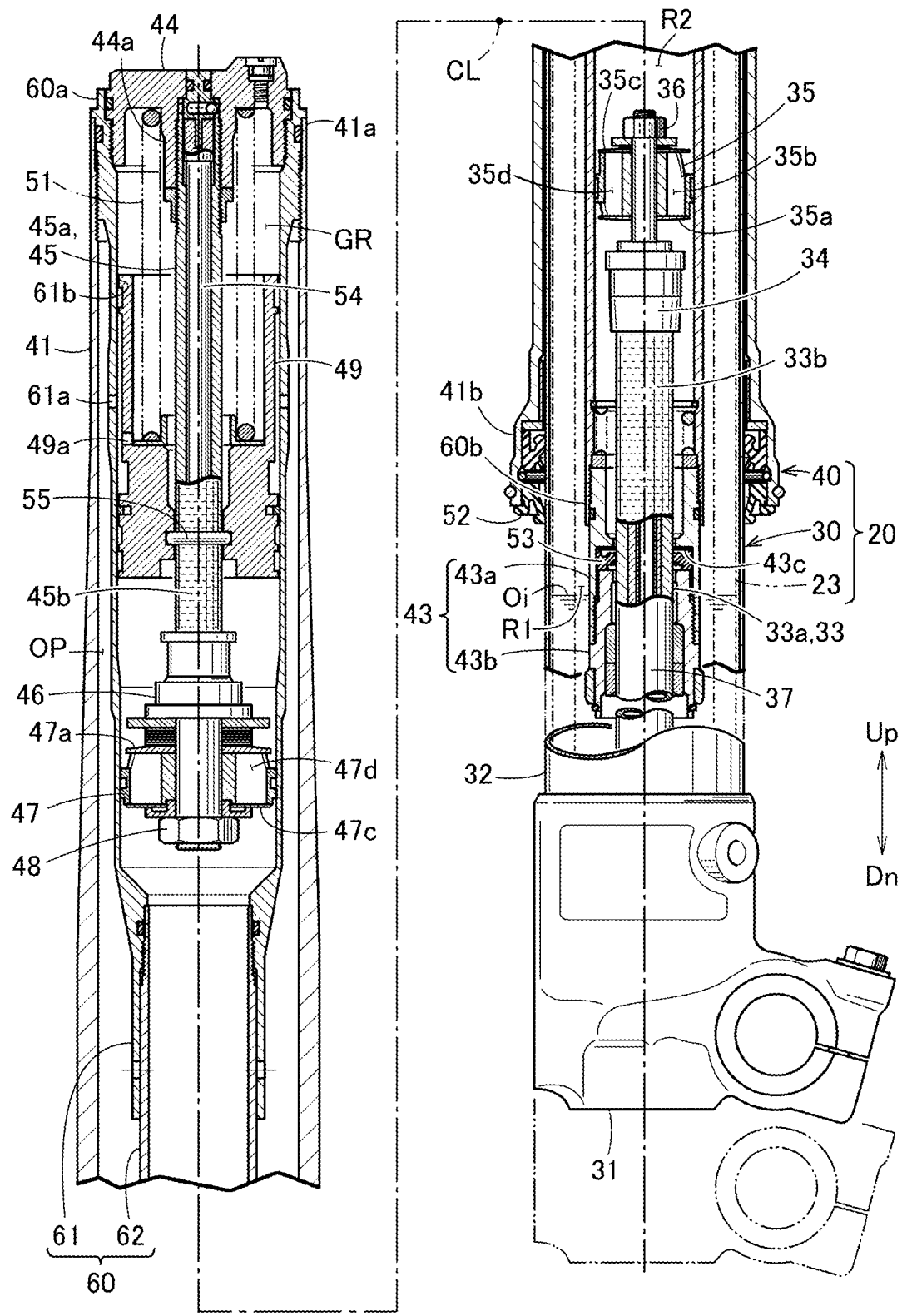
FIG. 6 is a diagram illustrating a state in which the hydraulic shock absorber shown in FIG. 2 is compressed.

Refer to FIG. 6 as well. During compression, the main rod 33 and the main piston 35 is raised relative to the fixed partition member 43. As a result, a part of the oil Oi adhering to the outer peripheral surface 33a of the main rod 33 passes through the fixed partition member 43 and reaches the second oil chamber R2.

Refer to FIG. 5. Dimple portions 33b are formed in the main rod 33. The oil Oi (see FIG. 2) enters the dimple portions 33b. As the main rod 33 rises, the oil Oi entering the dimple portions 33b is also pumped up to the second oil chamber R2 (see FIG. 2).

Refer to FIGS. 2 and 6. During compression, the oil Oi accumulated in the second oil chamber R2 passes through the sub piston 47 and presses the movable partition member 49 upward. When the movable partition member 49 is pushed up, a part of the oil Oi adheres to the sub rod 45.

Refer to FIG. 5. Dimple portions 45b are formed in the sub rod 45. The oil Oi (see FIG. 2) enters the dimple portions 45b.

Refer to FIGS. 2 and 6. After compression, the front fork 20 is extended. The movable partition member 49 is lowered by the biasing force of the return spring 51 against a force received from the oil Oi. A part of the sub rod 45 faces the second oil chamber R2 when the movable partition member 49 is raised, and faces the gas chamber GR after the movable partition member 49 is lowered. Therefore, a part of the oil Oi adhering to the sub rod 45 when the movable partition member 49 is raised enters the gas chamber GR.

The oil Oi entering the gas chamber GR passes through the oil holes 49a and 61a and reaches the oil passage OP. The oil Oi reaching the oil passage OP passes through the oil passage OP and is lowered to the first oil chamber RE That is, the oil Oi circulates through the first oil chamber R1, the second oil chamber R2, the gas chamber GR, and the oil passage OP.

Figure 7A:
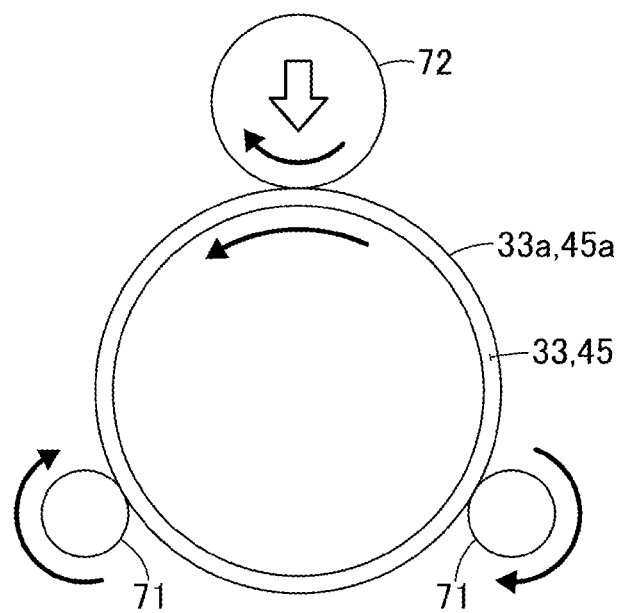
FIG. 7A is a diagram illustrating a pressing step.

Refer to FIG. 7A. FIG. 7A shows a pressing step of pressing a roller 72 against the outer peripheral surface 33a of the main rod 33. In the pressing step, the main rod 33 is placed on support rollers 71, 71, and is pressed by the roller 72 whose outer peripheral surface is formed smooth. By rotating and pressing the roller 72, the main rod 33 and the support rollers 71, 71 rotate as well. By pressing the roller 72, the outer peripheral surface 33a of the main rod 33 becomes a smoother surface. In addition, a structure of the outer peripheral surface 33a of the main rod 33 can become denser.

Figure 7B:
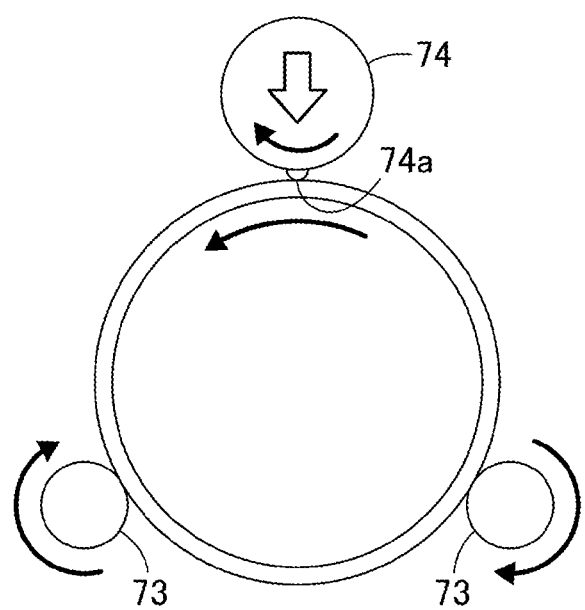
FIG. 7B is a diagram illustrating a dimple portion forming step.

Refer to FIG. 7B. FIG. 7B shows a dimple portion forming step of pressing a protrusion 74a against the outer peripheral surface 33a of the main rod 33 so as to form the dimple portions 33b (see FIG. 3). The main rod 33 after the pressing step is supported by support rollers 73, 73, and is pressed by the protrusion 74a protruding from a roller 74 toward an outer periphery. A diameter of the roller 74 is smaller than a diameter of the main rod 33. Therefore, by pressing the protrusion 74a protruding from the roller 74, the dimple portions 33b are intermittently formed on the outer peripheral surface 33a of the main rod 33. A depth and forming positions of the dimple portions 33b can be set depending on an amount of protrusion and an arrangement position of the protrusion 74a protruding from the roller 74.

Similarly, the pressing step and the dimple portion forming step can also be performed on the sub rod 45.

The present invention described above can be said as follows.

Refer to FIG. 3. The front fork 20 includes: the inner tube 32 formed in a tubular shape and having the oil Oi flowing therein; the damper cylinder 60 that is a tube body provided inside the inner tube 32 in a manner relatively movable along the axis CL of the inner tube 32, the damper cylinder 60 having the oil Oi flowing therein, and having the oil Oi flowing in the oil passage OP formed between the inner tube 32 and the damper cylinder 60; the fixed partition member 43 fixed to the inner periphery of the damper cylinder 60 and partitioning the one end of the first oil chamber R1 (see FIG. 2); the main rod 33 extending along the axis CL of the damper cylinder 60 through the fixed partition member 43, being supported by the axle bracket 31 (see FIG. 2) that supports the one end 32a of the inner tube 32, and being configured to move relative to the fixed partition member 43, the outer periphery of the main rod 33 having the dimple portions 33b that are formed in a staggered manner and each recessed toward the center of the main rod 33 in an elongated shape, and the boundary portion 33c that is a boundary between each dimple portion 33b and the outer peripheral surface is formed by a curved surface; and the main piston 35 provided at the distal end of the main rod 33 and allowing the oil Oi to pass.

Refer to FIG. 2 as well. Further, the front fork 20 includes: the outer tube 41 formed in a tubular shape and having the oil Oi flowing therein; the damper cylinder 60 that is a tube body provided inside the outer tube 41 and having one end fixed to the one end of the outer tube 41, the damper cylinder 60 having the oil Oi flowing therein, and having the oil Oi flowing in the oil passage OP formed between the outer tube 41 and the damper cylinder 60; the movable partition member 49 provided on the inner periphery of the damper cylinder 60 in a movable manner and partitioning the one end of the second oil chamber R2; the sub rod 45 extending along the axis of the damper cylinder 60 through the movable partition member 49, being supported by the fork bolt 44 that closes the one end 60a of the damper cylinder 60a, and being configured to move relative to the movable partition member 49, the outer periphery of the sub rod 45 having the dimple portions 33b that are formed in a staggered manner and each recessed toward the center of the sub rod 45 in an elongated shape, and the boundary portion 33c that is a boundary between each dimple portion 33b and the outer peripheral surface is formed by a curved surface; and the sub piston 47 provided at the distal end of the sub rod 45 and allowing the oil Oi to pass.

The above can be summarized as follows.

The front fork 20 includes: the first tube body 32, 41 formed in a tubular shape and having the oil Oi flowing therein; the second tube body 60 that is a tube body provided inside the first tube body 32, 41, the second tube body having the oil Oi flowing therein, and having the oil Oi flowing in the oil passage OP formed between the first tube body 32, 41 and the second tube body 60; the partition member 43, 49 provided in the second tube body 60 and partitioning the one end of the oil chamber R1, R2; the rod 33, 45 extending along the axis CL of the second tube body 60 through the partition member 43, 49 and being configured to move relative to the partition member 43, 49, the outer periphery of the rod 33, 45 having dimple portions 33b, 45b recessed toward the center of the rod 33, 45; and the piston 33, 45 provided at the distal end of the rod 33, 45 and allowing the oil Oi to pass.

Refer to FIG. 5 as well. The rod 33, 45 has the dimpled portions 33b, 45b that are recessed from the outer peripheral surface 33a, 45a toward the center (see the axis CL). A part of the oil Oi in the oil chamber R1, R2 enters the dimple portions 33b, 45b. When the rod 33, 45 passes through the partition member 43, 49 in a state where the oil Oi is accumulated in the dimple portions 33b, 45b, the oil Oi is carried to the adjacent oil chamber R2 or gas chamber GR. By increasing the amount of the oil Oi carried to the adjacent oil chamber R2 or gas chamber GR, the circulation amount of oil Oi can be increased. A front fork 20 capable of circulating the oil Oi sufficiently under various conditions of use can be provided.

Refer to FIG. 2. Further, the dimple portions 33b, 45b are formed intermittently in an elongated shape along the circumferential direction of the rod 33, 45.

A surface area of the dimple portions 33b, 45b is increased, and more oil Oi can be circulated. In addition, when the dimple portions 33b, 45b are formed along the axis, the oil Oi carried to the adjacent oil chamber R2 or gas chamber GR may return along the dimple portions 33b, 45b. In this respect, by forming the dimple portions 33b, 45b in the circumferential direction, the oil Oi carried to the adjacent oil chamber R2 or gas chamber GR can be prevented from returning along the dimple portions 33b, 45b. Therefore, more oil Oi can be circulated.

Refer to FIG. 4. Further, the plurality of dimple portions 33b, 45b are formed in a manner offset from each other with respect to the direction along the axis CL, and ones of the dimple portions 33b, 45b adjacent to each other in the direction along the axis CL are formed in a manner offset from each other with respect to the circumferential direction.

The oil Oi that does not enter the dimple portions 33b, 45b flows downward along the surface of the rod 33, 45. Since ones of the dimple portions 33b, 45b adjacent in the direction along the axis CL are offset from each other in the circumferential direction, the oil Oi flowing on the surface of the rod 33, 45 easily enters the adjacent dimple portions 33b, 45b. Therefore, more oil Oi can be circulated.

Refer to FIG. 5. Further, the boundary portion 33c that is a boundary between the outer peripheral surface 33a of the main rod 33 and each dimple portion 33b is formed by a curved surface. The same applies to the sub rod 45 (see FIG. 2).

By forming the boundary portion 33c by the curved surface, it is possible to easily flow the oil Oi into the dimple portions 33b. Therefore, more oil Oi can be circulated.

Refer to FIGS. 7A and 7B. The main rod 33 is manufactured through the pressing step of pressing the roller 72 against the outer peripheral surface 33a of the main rod 33 and the dimple portion forming step of pressing the protrusion 74a against the outer peripheral surface 33a of the main rod 33 so as to form the dimple portions 33b (see FIG. 4). The same applies to the sub rod 45 (see FIG. 2).

The surface of the main rod 33 is smoothed by the pressing step, and the dimple portions 33b are formed by pressing the protrusion 74a. Through the pressing step, hardness of the outer peripheral surface 33a of the main rod 33 can be increased, and unevenness and burrs can be smoothed. The oil Oi is prevented from being caught in the unevenness or the burrs, and more oil Oi can be flown due to the dimple portions 33b. Since the protrusion 74a is pressed to form the dimple portions 33b, generation of chips and burrs can be prevented. The same applies to the sub rod 45 (see FIG. 2).

Embodiment 2

The pressing step and the dimple portion forming step may be such that the dimple portion forming step is performed previously and the pressing step is performed next. Details of each step are the same as those in Embodiment 1, and a description thereof will be omitted. The front fork according to Embodiment 2 also has the effects according to the present invention.

Embodiment 3

Further, the pressing step and the dimple portion forming step can be performed alternately. Details of each step are the same as those in Embodiment 1, and a description thereof will be omitted. The front fork according to Embodiment 3 also has the effects according to the present invention.

The hydraulic shock absorber according to the present invention has been described based on an example to be mounted on a two-wheeled vehicle, but can also be mounted a saddle type vehicle such as a three-wheeled vehicle and a buggy, and other vehicles.

Further, the present invention can also be applied to a rear damper in addition to the front fork.

The rollers used in the pressing step and the dimple portion forming step may be a common roller. At this time, the protrusion 74a may be provided so as to be retractable with respect to the roller and protrude from the outer periphery of the roller only during the dimple portion forming step.

The present invention is not limited to the embodiments as long as the functions and effects of the present invention are achieved.

INDUSTRIAL APPLICABILITY

The hydraulic shock absorber of the present invention is suitable for a two-wheeled vehicle of an off-road type.

REFERENCE SIGNS LIST 20 front fork (hydraulic shock absorber)
31 axle bracket (support member)
32 inner tube (first tube body)
33 main rod (rod)
33a, 45a outer peripheral surface
33b, 45b dimple portion
33c, 45c boundary portion
35 main piston (piston)
41 outer tube (first tube body)
43 fixed partition member (partition member)
45 sub rod (rod)
47 sub piston (piston)
49 movable partition member (partition member)
60 damper cylinder (second tube body)
74a protrusion
CL axis
Oi oil
R1 first oil chamber (oil chamber)
R2 second oil chamber (oil chamber)
GR gas chamber
OP oil passage

What is claimed is:

1. A front fork comprising:
a first tube body formed in a tubular shape and having an oil flowing therein;
a second tube body that is a tube body provided inside the first tube body, the second tube body having the oil flowing therein, and having the oil flowing in an oil passage formed between the first tube body and the second tube body;
a partition member provided in the second tube body and partitioning one end of an oil chamber;
a rod extending along an axis of the second tube body through the partition member and being configured to move relative to the partition member, an outer periphery of the rod having a dimple portion recessed toward a center of the rod; and
a piston provided at a distal end of the rod and allowing the oil to pass, wherein
a boundary between an outer peripheral surface of the rod and the dimple portion is formed in cross section by a curved surface, and
the dimple portion is formed intermittently in an elongated shape along a circumferential direction of the rod.

2. The front fork according to claim 1, wherein
the dimple portion is configured such that the oil is accumulated therein and the accumulated oil flows into the oil chamber.

3. A front fork manufacturing method for manufacturing the front fork according to claim 1, the front fork manufacturing method comprising:
a pressing step of pressing a roller along the outer peripheral surface of the rod; and
a dimple portion forming step of pressing a protrusion against the outer peripheral surface of the rod so as to form the dimple portion.

4. The front fork according to claim 1, wherein
a plurality of dimple portions are formed in a manner offset from each other with respect to a direction along an axis of the rod, and
ones of the dimple portions adjacent to each other in the direction along the axis are formed in a manner offset from each other with respect to the circumferential direction.

5. A front fork manufacturing method for manufacturing the front fork according to claim 4, the front fork manufacturing method comprising:
a pressing step of pressing a roller along the outer peripheral surface of the rod; and
a dimple portion forming step of pressing a protrusion against the outer peripheral surface of the rod so as to form the dimple portion.

6. A front fork comprising:
an inner tube formed in a tubular shape and having an oil flowing therein;
a damper cylinder that is a tube body provided inside the inner tube body and configured to relatively move along an axis of the inner tube, the damper cylinder having the oil flowing therein, and having the oil flowing in an oil passage formed between the inner tube and the damper cylinder;
a fixed partition member fixed to an inner periphery of the damper cylinder and partitioning one end of an oil chamber;
a rod extending along an axial direction of the damper cylinder through the fixed partition member, being supported by a support member that supports one end of the inner tube, and being configured to move relative to the fixed partition member, an outer periphery of the rod having a plurality of dimple portions that are formed in a staggered manner, each of the dimple portions being formed in an elongated shape along a circumferential direction of the rod and recessed toward a center of the rod, a boundary between each of the dimple portions and an outer peripheral surface of the rod being formed in cross section by a curved surface; and
a piston provided at a distal end of the rod and allowing the oil to pass.

7. A front fork manufacturing method for manufacturing the front fork according to claim 6, the front fork manufacturing method comprising:
a pressing step of pressing a roller along the outer peripheral surface of the rod; and
a dimple portion forming step of pressing a protrusion against the outer peripheral surface of the rod so as to form the dimple portion.

8. A front fork comprising:
an outer tube formed in a tubular shape and having an oil flowing therein;
a damper cylinder that is a tube body provided inside the outer tube and having one end fixed to one end of the outer tube, the damper cylinder having the oil flowing therein, and having the oil flowing in an oil passage formed between the outer tube and the damper cylinder;
a movable partition member provided on an inner periphery of the damper cylinder in a movable manner and partitioning one end of an oil chamber;
a rod extending along an axial direction of the damper cylinder through the movable partition member, being supported by a fork bolt that closes one end of the damper cylinder, and being configured to move relative to the movable partition member, an outer periphery of the rod having a plurality of dimple portions that are formed in a staggered manner, each of the dimple portions being formed in an elongated shape along a circumferential direction of the rod and recessed toward a center of the rod, a boundary between each of the dimple portions and an outer peripheral surface of the rod being formed in cross section by a curved surface; and
a piston provided at a distal end of the rod and allowing the oil to pass.

9. A front fork manufacturing method for manufacturing the front fork according to claim 8, the front fork manufacturing method comprising:
a pressing step of pressing a roller along the outer peripheral surface of the rod; and
a dimple portion forming step of pressing a protrusion against the outer peripheral surface of the rod so as to form the dimple portion.

\* \* \* \* \*